(12) United States Patent
Chen et al.

(10) Patent No.: US 11,777,168 B2
(45) Date of Patent: Oct. 3, 2023

(54) BATTERY PROTECTION MEMBER AND VEHICLE

(71) Applicant: HONDA MOTOR CO., LTD., Tokyo (JP)

(72) Inventors: Zeming Chen, Guangzhou (CN); Kiyohiko Matsuoka, Guangzhou (CN); Chunlang Liang, Guangzhou (CN)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 17/510,520

(22) Filed: Oct. 26, 2021

(65) Prior Publication Data

US 2022/0131226 A1    Apr. 28, 2022

(30) Foreign Application Priority Data

Oct. 27, 2020    (CN) .......................... 202011164713.3

(51) Int. Cl.
| | |
|---|---|
| *B60K 1/02* | (2006.01) |
| *H01M 50/242* | (2021.01) |
| *H01M 50/202* | (2021.01) |
| *H01M 50/249* | (2021.01) |
| *B60K 1/04* | (2019.01) |

(52) U.S. Cl.
CPC ....... *H01M 50/242* (2021.01); *H01M 50/202* (2021.01); *H01M 50/249* (2021.01); *B60K 2001/0438* (2013.01)

(58) Field of Classification Search
CPC ............. H01M 50/242; H01M 50/202; H01M 50/249; B60K 2001/0438; B60K 1/04
See application file for complete search history.

(56) References Cited

U.S. PATENT DOCUMENTS

| | | | | |
|---|---|---|---|---|
| 10,611,234 | B1* | 4/2020 | Berels ................. | H01M 10/656 |
| 11,124,076 | B1* | 9/2021 | Borghi ................. | B60L 50/66 |
| 11,351,850 | B1* | 6/2022 | Calandruccio ........... | B60K 1/00 |
| 2017/0324128 | A1* | 11/2017 | Milton .............. | H01M 10/6557 |
| 2018/0261899 | A1* | 9/2018 | Milton .............. | H01M 10/6556 |
| 2021/0214021 | A1* | 7/2021 | Aitharaju ................ | B60K 1/04 |
| 2021/0245596 | A1* | 8/2021 | Arana ................ | H01M 50/242 |
| 2022/0039278 | A1* | 2/2022 | Golm ..................... | B21D 37/16 |
| 2022/0126664 | A1* | 4/2022 | Caliskan ............ | B62D 25/2036 |
| 2022/0194489 | A1* | 6/2022 | Roche ...................... | B60K 1/00 |

* cited by examiner

*Primary Examiner* — Jason D Shanske
*Assistant Examiner* — James J Triggs
(74) *Attorney, Agent, or Firm* — AMIN, TUROCY & WATSON, LLP

(57) ABSTRACT

A battery protection member includes a main body portion and a fixation portion, wherein the battery protection member is connected with a bottom portion of a vehicle via the fixation portion, and the battery protection member is disposed at a front-end side of a battery pack and to be apart from the battery pack. At least a part of a front-end portion of the battery pack is in a range with the fixation portion as a center and having a rotation radius of the battery protection member as a radius. An inclination surface is formed at the front-end side of the main body portion to extend from an upper side toward a rear side and a lower side, and when the inclination surface receives a collision, the angle between the inclination surface and a horizontal direction is decreased.

12 Claims, 4 Drawing Sheets

BATTERY PROTECTION MEMBER AND VEHICLE

CROSS-REFERENCE TO RELATED APPLICATION

The priority is claimed based on a Chinese Patent Application No. 202011164713.3, filed on Oct. 27, 2020. The content of the Chinese Patent Application is incorporated herein by reference.

TECHNICAL FIELD

The present disclosure relates to a technical field of a motor vehicle. More specifically, the present disclosure relates to a battery protection member and a vehicle.

BACKGROUND ART

An electric vehicle is a vehicle with an on-board battery as the power, using a motor to drive the wheel, and meeting various requirements of the road traffic safety and safety regulations. Accordingly, it is very important to make and keep the on-board battery installed in the electric vehicle stable and safe.

A currently available battery pack in the electric vehicle generally only has the accommodation function and a connector of the battery pack is not protected, while the layout of the vehicle chassis is complicated and has poor aesthetics such that there is not any protection with respect to the front end of the battery pack. Accordingly, it is easy for the front end of the battery pack to be scratched and damaged by obstacles so as to threaten the safety of the battery. Also, the currently available battery protection structure is only possible to correspond to the collision by the obstacles during the driving at a low speed (for example, less than 5 km/h), it is impossible to satisfy the protection requirement for the battery pack while driving at a higher speed (for example, at a speed of 5 km/h, 6 km/h or the like).

SUMMARY

The present application is made to provide a battery protection member and a vehicle, and an object of the present application includes solving the problem that the front end of the battery pack is exposed under the vehicle and the battery pack is easily scratched by obstacles and damaged. However, the object of the present application is not limited thereto.

In order to solve the above-described technical problem, an aspect of the present application provides a battery protection member including a main body portion and a fixation portion, wherein the battery protection member is connected with a bottom portion of a vehicle via the fixation portion, and the battery protection member is disposed at a front-end side of a battery pack and to be apart from the battery pack. At least a part of a front-end portion of the battery pack is in a range with the fixation portion as a center and having a rotation radius of the battery protection member as a radius. An inclination surface is formed at the front-end side of the main body portion to extend from an upper side toward a rear side and a lower side, and when the inclination surface receives a collision, an angle between the inclination surface and a horizontal direction is decreased.

Here, the battery protection member is disposed at the front-end side of the battery pack and apart from the battery pack so as to secure an enough collision deformation space for the battery protection member. When the battery protection member receives the collision by the obstacle, it is possible for the battery protection member to be deflected and deformed to receive energy generated during the collision by the obstacle. When the battery protection member is deflected, the inclination angle of the inclination surface decreases such that it is possible to lift the whole vehicle at the inclination surface with the obstacle as a pivot so as to make the obstacle smoothly pass through the front-end of the battery pack. At least a part of the front-end portion of the battery pack is in the range with the fixation portion as the center and having the rotation radius of the battery protection member as the radius is in order to secure the protection for the front-end portion of the battery pack, prevent a distance between the battery protection member and the battery pack from being too large, avoid a situation that the obstacle still hits the front-end portion of the battery pack after passing through, while ensuring the battery protection member to be capable of abutting the front-end portion of the battery pack after the battery protection member is deflected and deformed to a certain level so as to prevent the battery protection member from being deflected too much. The above-described configuration can realize the comprehensive protection of the front-end portion of the battery pack and it is possible to protect the front-end portion of the battery pack during the driving at a higher speed.

Furthermore, when the inclination surface receives the collision, the battery protection member may be deflected toward a rear side with a connection portion of the fixation portion and the bottom portion of the vehicle as a pivot so as to decrease an angle between the inclination surface and the horizontal direction.

The battery protection member is configured to be deflected toward the rear side so as to absorb the collision force, and while making the inclination angle of the inclination surface to decrease. Accordingly, it is possible to lift the whole vehicle at the position of the inclination surface with the obstacle as the pivot to case the obstacle to smoothly pass through the front-end portion of the battery pack so as to reduce the impact to the front-end portion of the battery pack and realize the protection effect.

Furthermore, the lowest point of the inclination surface is lower than the lowest point of the front-end portion of the battery pack.

The position of the inclination surface is relatively lower than that of the battery pack is to ensure that the obstacle capable of passing through the inclination surface does not cause any impact to the front-end portion of the battery pack due to the protection of the battery protection member so as to prevent the obstacle capable of directly passing through the battery protection member thereunder from hitting the front-end portion of the battery pack.

Furthermore, when the battery protection member is installed in the bottom portion of the vehicle, the highest point of the inclination surface is higher than the lowest point of a vehicle auxiliary bracket.

Since the lowest point of the vehicle auxiliary bracket is a low point of the bottom portion of the vehicle at the front-end side such that it is ensured that any obstacle having a height capable of entering the bottom portion of the vehicle firstly hits the battery protection member so as to effectively prevent the collision by the obstacle entering the bottom portion of the vehicle with respect to the front-end portion of the battery pack.

Furthermore, a buffer cavity is formed inside the main body portion, and a local part of the inclination surface is a structural surface of the buffer cavity.

The battery protection member can absorb the energy generated by the collision of the obstacle via the buffer cavity and the deflection deformation of the battery protection member. The double absorption with respect to the collision force prevents the collision force from applying to the front-end portion of the battery pack so as to more suitably protect the front-end portion of the battery pack. Also, due to the double absorption of the collision force, the configuration according to the present aspect can correspond to a larger collision force so as to solve the problem that the protection to the front-end portion of the battery pack is relatively weak at a higher speed.

Furthermore, a predetermined distance is provided between an upper wall of the buffer cavity and the connection portion of the fixation portion and the bottom portion of the vehicle.

When the deflection deformation occurs in the battery protection member, since the predetermined distance is provided therebetween, it is possible to increase the deflection range of the battery protection member so as to prevent the battery protection member from easily coming into collision with the wire harness in the bottom portion of the vehicle and the front-end portion of the battery pack, and only when the deflection distance is relatively large, the battery protection pack comes into collision with the wire harness and the front-end portion of the battery pack. Accordingly, even if the collision with the obstacle occurs in a higher driving speed and the collision force is relatively large, the battery protection member is still able to protect the front-end portion of the battery pack.

The battery protection member further includes a blocking portion extending from a rear-end edge of the main body portion toward the rear-end side, the blocking portion being configured to abut on the front-end portion of the battery pack.

When the battery protection member deflects to a certain level, the blocking portion abuts on the front-end portion of the battery pack so as to effectively protect the battery protection member from further deflecting and damage the front-end portion of the battery pack.

Furthermore, a first arc-shaped flange is formed to downwardly extend from a rear-end side edge of the main body portion and/or a second arc-shaped flange is formed to extend from an upper edge of the inclination surface toward the front-end side.

When the deflection deformation occurs in the battery protection member, even the first arc-shaped flange and/or the second arc-shaped flange come in contact with the wire harness in the vicinity thereof, the wire harness is not directly cut such that the wire harness is protected to some extent.

Furthermore, the battery protection member includes an upper plate and a lower plate, wherein the upper plate and the lower plate are fixedly connected with each other to from the buffer cavity being surrounded by the upper plate and the lower plate, the inclination surface is formed by a front-end surface of the lower plate, a front-end surface of the upper plate is attached to an upper portion of the inclination surface, a lower portion of the inclination surface is the structural surface of the buffer cavity, and the fixation portion is formed in the upper plate and/or the lower plate.

The front-end surface of the upper plate is attached to a surface of the upper portion of the inclination surface such that the upper portion of the inclination surface is formed by extending the attached upper plate and the lower plate to achieve a better rigidity. When the collision by the obstacle occurs, it is possible for the upper portion of the inclination surface to bear a larger collision impact without a deformation. The buffer cavity is formed by being surrounded by the upper plate and the lower plate such that the buffer cavity is also capable of absorbing a part of the collision force so as to further improve the anti-collision performance by the battery protection member.

Furthermore, the front-end surface of the upper plate and the front-end surface of the lower plate is attached and fixed with each other, and a height of the upper edge of the front-end surface of the upper plate is lower than a height of the upper edge of the front-end surface of the lower plate, a plurality of first reinforced structures are disposed at intervals on the front-end surface of the upper plate, and a plurality of second reinforced structures are disposed at intervals on the front-end surface of the lower plate.

A second arc-shaped flange is provided at the upper edge of the front-end surface of the lower plate so as to prevent the surrounding wire harness from being damaged; however, in order to prevent the surrounding wire harness of the front-end surface of the upper plate from being damaged, the height of the upper edge of the front-end surface of the upper plate has to be lower than the height of the upper edge of the front-end surface of the lower plate so as to ensure that the upper edge of the front-end surface of the upper plate does not damage the surrounding wire harness. Also, due to the height difference therebetween, in order to ensure the rigidity of the upper portion of the inclination surface, it is possible to improve the structural strength of the inclination surface and further improve the rigidity of the inclination surface by providing the plurality of first reinforced structures and the plurality of second reinforced structures in the upper plate and the lower plate, respectively.

Furthermore, an angle between the inclination surface and the horizontal direction is equal to or less than 35 degrees.

When the inclination surface is formed to break down the collision force after receiving the collision force on the inclination surface, and the above-mentioned design is possible to cause the component of the collision force received by the inclination surface toward the rear-end side to be relatively small such that a degree of the deflection of the battery protection member is not too large and the possibility and the possibility that the battery protection member colliding with the front-end portion of the battery pack is reduced so as to further protect the safety of the front-end portion of the battery pack and suitably responding to the obstacle collision problem at the higher driving speed.

The present disclosure further provides a vehicle including a bottom portion of the vehicle, wherein a battery pack is installed in the bottom portion of the vehicle, and the above-described battery protection member is provided at a front-end side of the battery pack.

Advantageous Effects of Invention

According to the battery protection member and the vehicle disclosed in the above-described aspects of the present application, the battery protection member includes the inclination surface and the buffer cavity for receiving the collision with the obstacle at the inclination surface to deflect the battery protection member itself toward the rear side while the buffer cavity is configured to absorb the collision so as to double absorb the energy generated during the collision with the obstacle. Accordingly, it is possible to solve the technical problem where the battery pack is exposed under the bottom portion of the vehicle such that it is easy for the battery pack to be damaged due to the scratch of the obstacle. As a result, it is possible to effectively reduce the risk where the front-end portion of the battery pack is scratched by the obstacle so as to ensure the safety of the front-end portion of the battery pack even in a higher driving speed. Also, the blocking portion is provided to avoid the damage to the front-end portion of the battery pack due to the excessive deflection of the battery protection member, and the configuration of the flange is possible to protect the surrounding wire harness.

DESCRIPTION OF EMBODIMENTS

Figure 1:
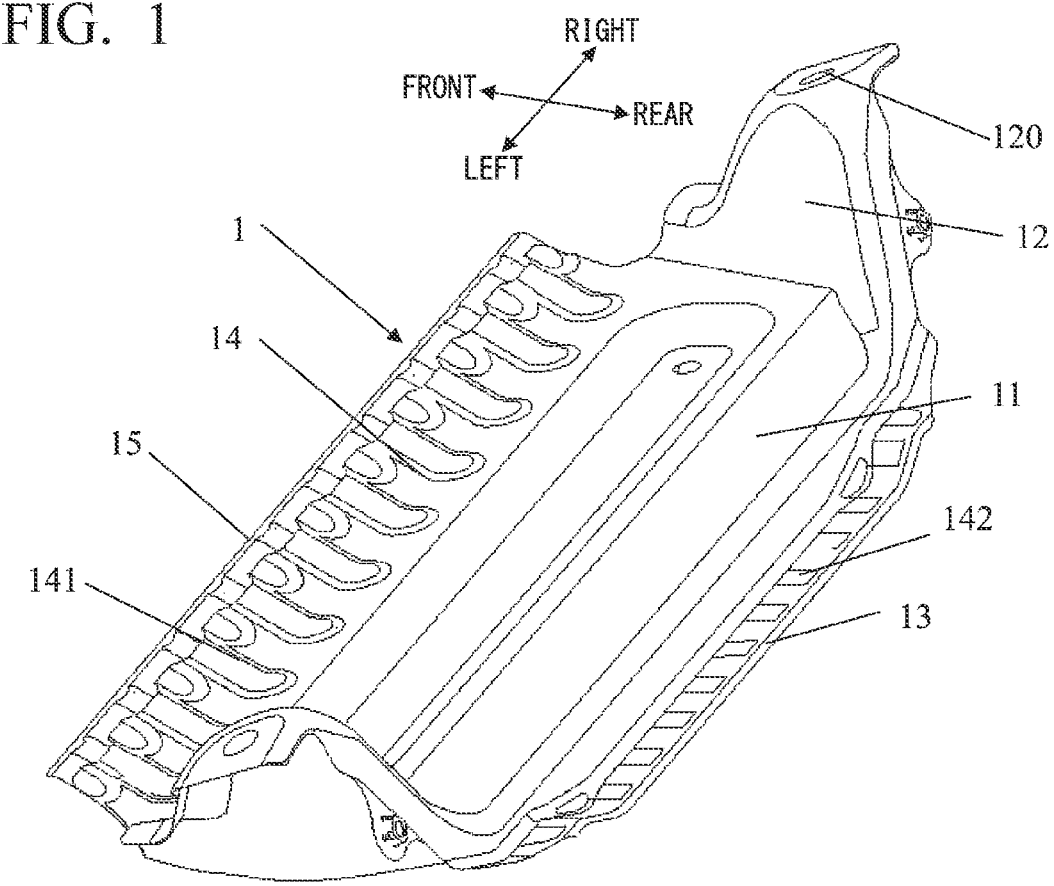
FIG. 1 is a three-dimensional schematic view showing a battery protection member according to a first embodiment of the present disclosure.

In order to make the technical problem, the solutions and the effects of the present application more clear, hereinafter, embodiments of the present application will be described with reference to the figures. Hereinafter, the following embodiments are only used to describe the present application and are not used to limit the present application. Also, the configurations described in figures are only specific examples of the present application and the person with ordinary skill in the art can achieve other figures based on the enclosed figures of the present application.

It is necessary to clarify that when a member is "fixed", "disposed", or "connected" to another member, the member may be directly on the other member or indirectly on the other member. The directions and positional relationships indicated by the terms "front", "rear", "up", "down", "left", and "right" are only used for easily describing the directions and positional relationships based on the enclosed figures, and they are not used to indicate or implicit the apparatus and the element thereof have the particular directions and positions, to be configured and operated in the particular directions and at the specific positions, such that the present disclosure is not limited by these terms. For a person with ordinary skill in the art, the specific meaning of the above-mentioned terms may be suitably understood according to the actual situation. The terms "first", "second", and the like are only used for making the description easy to understand, and they are not used to indicate or implicit the importance of the configurations or implicit the amount of the technical features. Unless otherwise defined, the term "a plurality of" means that an amount equal to two or more than two.

First Embodiment

In FIG. 1 to FIG. 4, the present embodiment provides a battery protection member 1 including a main body portion 11 and a fixation portion 12. The battery protection member 1 is connected to a vehicle bottom portion 2 via the fixation portion 12, and the battery protection member 1 is disposed to be apart from a battery pack 3 at a front-end side of the battery pack 3 so the battery protection member 1 has an enough space for a collision deformation. At least part of the front-end portion of the batter pack 3 is positioned in a range defined to have a center at the fixation portion 12 and a radius of a rotation radius of the battery protection member 1. It is possible to ensure the protection to the front-end portion of the battery pack 3, to prevent a distance between the battery protection member 1 and the battery pack 3 from being too large, and to prevent a situation in which an obstacle still collides with the front-end portion of the battery pack 3 after the obstacle passes therethrough. Also, it is possible to ensure that the battery protection member 1 can abut the front-end portion of the battery pack 3 after the battery protection member 1 deflects and deforms to a certain degree so as to prevent the battery protection member 1 from excessively deflecting. An inclination surface 111 is formed in the front-end portion of the main body portion 11 and the inclination surface extends from an upper side toward a lower side and a rear-end side so as to make the battery protection member 1 be able to receive the collision via the inclination surface 111.

Figure 4:
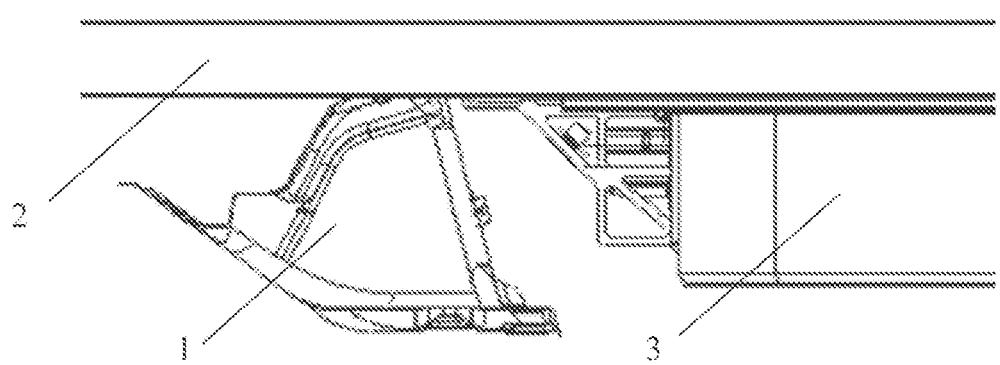
FIG. 4 is a first schematic view showing a working state of the battery protection member according to the first embodiment of the present disclosure.
Figure 5:
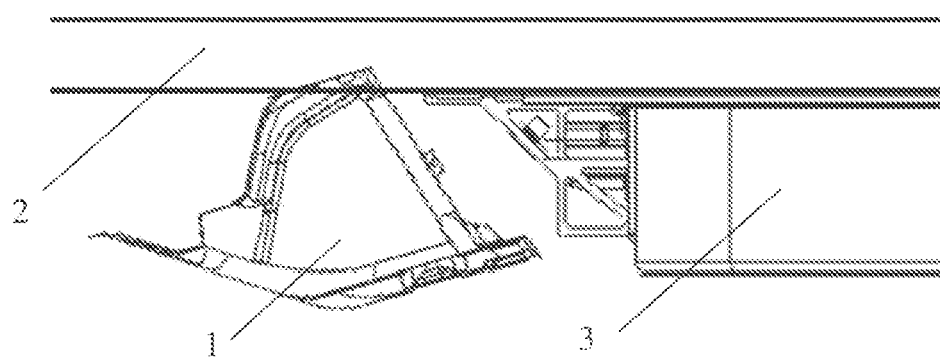
FIG. 5 is a second schematic view showing the working state of the battery protection member according to the first embodiment of the present disclosure.
Figure 6:
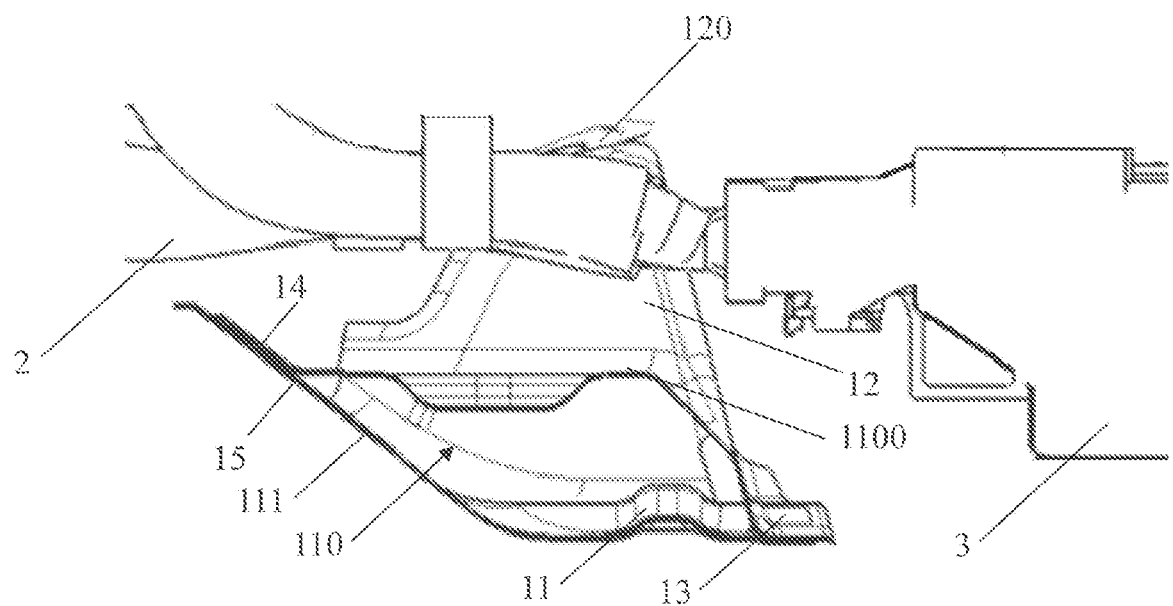
FIG. 6 is a cross-sectional view of FIG. 4.

More specifically, the fixation portion 12 is formed to extend from the main body portion 11 toward a side of the vehicle bottom portion 2, and the fixation portion 12 can be fixed and connected to the vehicle bottom portion 2 by the screw fixation so as to install the whole battery protection member 1 on the vehicle bottom portion 2. The fixation portion 12 may be fixed by other methods rather than the screw fixation. After the battery protection member 1 has been installed, the main body portion 11 is placed horizontally to be disposed apart from the battery pack 3 that is exposed in the vehicle bottom portion 2, and at least part of the front-end portion of the batter pack 3 is positioned in the range defined to have the center at the fixation portion 12 and the radius of the rotation radius of the battery protection member 1. The inclination surface 111 of the main body portion 11 blocks the front-end side of the battery pack 3. When the inclination surface 111 receives the collision of the obstacle and a reaction force given by the obstacle exceeds a threshold value for making the battery protection member 1 to deflect, the battery protection member 1 deflects toward the rear-end side at a connection portion 120 of the fixation portion 12 and the vehicle bottom portion 2 as a pivot. Referring to FIG. 4 to FIG. 6, during this process, the battery protection member 1 can absorb the energy generated due to the collision of the obstacle by the deflection deformation so as to cause an angle α between the inclination surface 111 and the horizontal direction to gradually decrease. As a result, it is possible to lift the whole vehicle at the inclination surface 111 and with the obstacle as the pivot so as to make the obstacle smoothly pass through the front-end portion of the battery pack 3 and prevent the obstacle from directly coming into contact and generating an impact to the front-end portion of the battery pack 3. Accordingly, it is possible to realize the comprehensive protection to the overall front-end portion of the battery pack 3.

Furthermore, referring to FIG. 4, in the present embodiment, the lowest point of the inclination surface 111 is lower than the lowest point of the front-end portion of the battery pack 3. In other words, a position of the inclination surface 111 is relatively lower than the front-end portion of the battery pack. According to the configuration, it is possible to ensure that the obstacle passing through the inclination surface 111 does not generate the impact to the front-end portion of the battery pack 3 and prevent the obstacle capable of directly passing through under the battery protection member 1 to collide with the front-end portion of the battery pack 3 so as to effectively protect the front-end portion of the battery pack 3.

Furthermore, in FIG. 4, in the present embodiment, when the battery protection member 1 is installed in the vehicle bottom portion 2, the highest point of the inclination surface 111 is higher than the lowest point of a vehicle auxiliary bracket (not shown). The lowest point of the vehicle auxiliary bracket is generally the same as the lowest point of the bottom portion at the front end side of the vehicle, that is, all of the obstacles capable of entering the gap between the vehicle and the ground can be blocked by the inclination surface 111 such that the obstacles cannot collide with the front-end portion of the battery pack 3. In other words, it is ensured that all of the obstacles with the height that can enter the vehicle bottom portion 2 firstly collide with the battery protection member 1 so as to efficiently avoid the collision by the obstacles with respect to the front-end portion of the battery pack 3.

Figure 3:
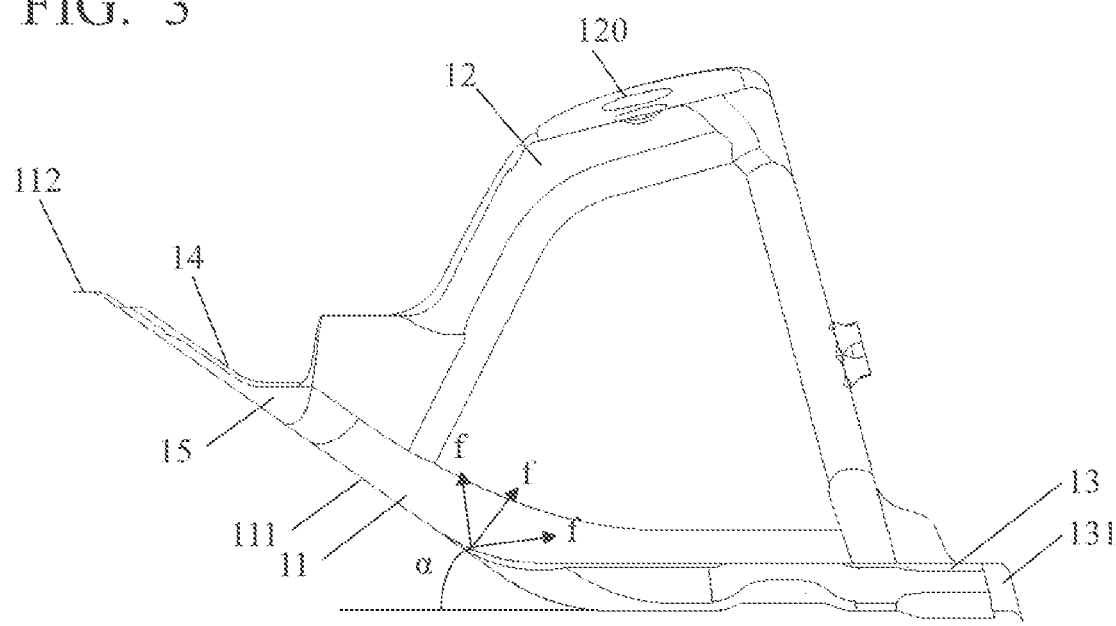
FIG. 3 is a left-side schematic view showing the battery protection member according to the first embodiment of the present disclosure.

Furthermore, in FIG. 1, FIG. 3 and FIG. 6, in the present embodiment, a buffer cavity 110 is formed inside the main body portion 11, and a local part of the inclination surface 111 is a structural surface of the buffer cavity 110. More specifically, the buffer cavity 110 is a hollow cavity formed by being surrounded by several structural surfaces of the main body portion 11. Here, the inclination surface 111 is a front-end structural surface of the main body portion 11, and the local part of the inclination surface 111 together with the upper structural surface, the lower structural surface, the left structural surface, the right structural surface, and the rear-end structural surface of the main body portion 11 form and surround the buffer cavity 110. The battery protection member 1 can absorb the energy generated due to the collision of the obstacle by the buffer cavity 110 together with the deflection deformation of the battery protection member 1. The double absorption of the collision force prevents the collision force by the obstacle from applying to the front-end portion of the battery pack 3 so as to more suitably protect the front-end portion of the battery pack 3. Due to the double absorption of the collision force, the battery protection member 1 can respond to the stronger collision force so as to solve the problem where the protection of the front-end portion of the battery pack 3 at a high driving speed is relatively weak.

Furthermore, in FIG. 1, FIG. 3, FIG. 4, and FIG. 6, in the present embodiment, a predetermined distance is provided between an upper cavity wall 1100 and a connection portion 120 of the fixation portion 12 and the vehicle bottom portion 2. In other words, after the battery protection member 1 has been installed, there is an enough gap formed between an upper-end surface of the main body portion 11 and the vehicle bottom portion 2. When the deflection deformation occurs in the battery protection member 1, due to the predetermined distance, it is possible to enlarge the deflection deformation range of the battery protection member 1 and to ensure that the battery protection member 1 does not collide with the wire harness in the vehicle bottom portion 2 and the front-end portion of the battery pack 3. Only in the case in which a shift distance during the deflection is relatively large, the battery protection member 1 collides with the wire harness and the front-end portion of the battery pack 3. Accordingly, even in the case in which the collision force during the collision by the obstacle occurring at a higher driving speed is large, the battery protection member 1 is still capable of protecting the front-end portion of the battery pack 3.

Furthermore, in FIG. 1, and FIG. 3 to FIG. 6, in the present embodiment, the battery protection member 1 further includes a blocking portion 13 for abutting to the front-end portion of the battery pack 3. The blocking portion 13 is formed to extend from a rear-end edge of the main portion 11 toward the rear-end side, and when the battery protection member 1 collides with the obstacle and the angle α between the inclination surface 111 and the horizontal direction decreases to a certain degree, the blocking portion 13 abuts to the front-end portion of the battery pack so as to prevent the battery protection member 1 from further deflecting toward the rear-end side. Accordingly, it is possible to effectively avoid the damage to the battery pack 3 due to the continuing deflection deformation of the battery protection member 1.

Furthermore, in FIG. 1 and FIG. 3, in the present embodiment, a first arc-shaped flange 131 is formed to extend downwardly from the rear-end edge of the main body portion 11. In other words, the first arc-shaped flange 131 is formed to extend downwardly from the edge of the blocking portion 13, wherein the edge is far from the main body portion 11. Accordingly, it is possible to avoid a sharp cutting edge formed at the edge of the blocking portion 13 far from the main body portion 11 such that even the deflection deformation occurs in the battery protection member 1 and the blocking portion 13 collides with the wire harness in the vehicle bottom portion 2, the first arc-shaped flange 131 does not directly cut off the surrounding wire harness when the first arc-shaped flange 131 comes into contact with the wire harness in the vicinity thereof and the wire harness is protected.

Furthermore, in FIG. 1 and FIG. 3, in the present embodiment, a second arc-shaped flange 112 is formed to extend downwardly and toward the front-end side from the upper edge of the inclination surface 11, in other words, the upper edge of the front-end portion of the main body portion 11 is folded. By performing such a processing, it is possible to avoid a sharp cutting edge formed at the upper edge of the inclination surface 111 such that even the deflection deformation occurs in the battery protection member 1 and the collision with the wire harness in the vehicle bottom portion 2 occurs, the second arc-shaped flange 112 does not directly cut off the surrounding wire harness when the second arc-shaped flange 112 comes into contact with the wire harness in the vicinity thereof and the wire harness is protected.

Furthermore, in FIG. 1, FIG. 3 and FIG. 6, in the present embodiment, the battery protection member 1 includes an upper plate 14 and a lower plate 15. The upper plate 14 and the lower plate 15 are connected and fixed to each other and the buffer cavity 110 is formed by being surrounded by the upper plate 14 and the lower plate 15. The main body portion 11 is formed by attaching the upper plate 14 and the lower plate 15. Similarly, the fixation portion 12 is formed by attaching together the upper plate 14 and the lower plate 15 and extend toward the vehicle bottom portion 2. The inclination surface 111 is formed by the front-end side surface of the lower plate 15. The front-end surface of the upper plate 14 is attached to the surface of the upper portion of the inclination surface 111, and the lower portion of the inclination surface is the structural surface of the buffer cavity 110. More specifically, the front-end portion of the lower plate 15 is inclined and extends upwardly and toward the front-end side to form the inclination surface 111. The front-end portion of the upper plate 14 is inclined and extends upwardly and toward the front-end side to form the front-end surface, and the front-end surface of the upper plate 14 is welded to the surface of the upper portion of the inclination surface 111 at the side near the upper plate so as to improve the rigidity of the inclination surface 111. When the collision by the obstacle is received, the upper portion of the inclination surface 111 can resist a larger collision impact without deformation due to the collision. The buffer cavity 110 is formed by being surrounded by the intermediate portion of the upper plate 14, the intermediate portion of the lower plate 15 and the lower portion in the left-side end portion and the right-side end portion of the upper plate 15. The buffer cavity 110 can absorb the energy generated due to the collision by the obstacle together with the deflection deformation of the battery protection member 1 so as to improve the overall anti-collision effect of the battery protection member 1.

Figure 2:
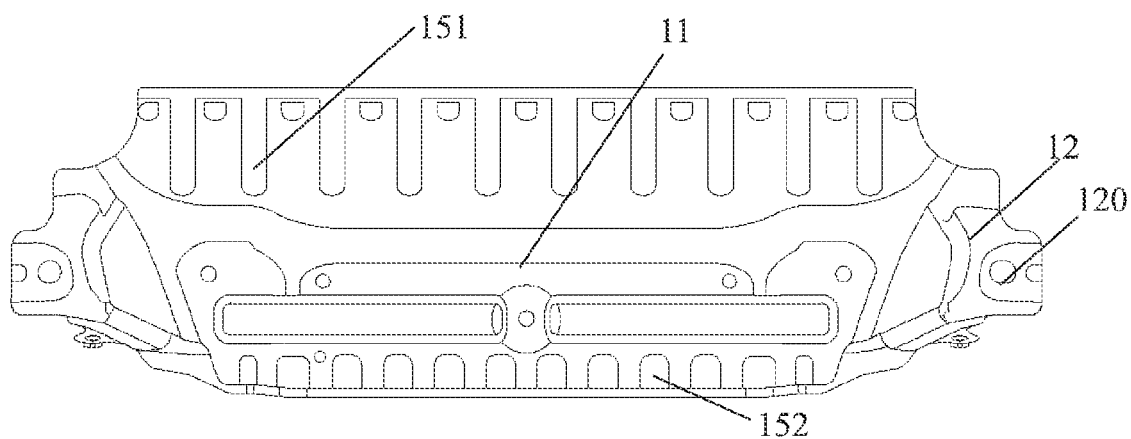
FIG. 2 is a three-dimensional schematic view showing the battery protection member from another angle according to the first embodiment of the present disclosure.

Furthermore, in FIG. 1, FIG. 2 and FIG. 6, in the present embodiment, the front-end surface of the upper plate 14 and the front-end surface of the lower plate 15 are attached and fixed to each other, and the height of the upper edge of the front-end surface of the upper plate 14 is lower than the height of the upper edge of the front-end surface of the lower plate 15. A plurality of first reinforced structures 141 are provided at intervals on the front-end surface of the upper plate 14, and a plurality of second reinforced structures 151 are provided at intervals on the front-end surface of the lower plate 15. More specifically, the first reinforced structure 141 and the second reinforced structure 151 can be reinforce grooves or reinforce tanks. The plurality of first reinforced structures 141 are provided to be equally spaced along the length direction of the upper plate 14 on the front-end surface of the upper plate 14, and the plurality of second reinforced structures 151 are provided to be equally spaced along the length direction of the lower plate 15 on the front-end surface of the lower plate 15. On the inclination surface 111, the plurality of first reinforced structures 141 and the second reinforced structures 151 are disposed to overlap each other. However, it is not limited to dispose the plurality of first reinforced structures 141 and the second reinforced structures 151 to be disposed to overlap each other. The second arc-shaped flange 112 is disposed at the upper edge of the front-end surface of the lower plate 15 for preventing the damage to the surrounding wire harness, and in order to prevent the damage to the surrounding wire harness by the upper edge of the front-end surface of the upper plate 14, it is necessary to ensure that the height of the upper edge of the front-end surface of the upper plate 14 is lower than the height of the upper edge of the front-end surface of the lower plate 15 to prevent the damage to the surrounding wire harness by the upper edge of the front-end surface of the upper plate 14. Due to the height difference therebetween, in order to ensure the rigidity of the upper portion of the inclination surface 111, the plurality of first reinforced structures 141 and the plurality of second reinforced structures 151 are disposed on the upper plate 14 and the lower plate 15 respectively so as to improve the structural strength of the inclination surface 111 and further improves the rigidity of the inclination surface 111. Also, it is possible to provide reinforced structure in other part of the upper plate 14 and the lower plate 15 such as the intermediate portion thereof to improve the rigidity of the battery protection member 1.

In the present embodiment, the blocking portion 13 is formed by attaching the rear-end portion of the upper plate 14 and the rear-end portion of the lower plate 15. A plurality of third reinforced structures 142 are provided at intervals along the length direction in the rear-end portion of the upper plate 14, and a plurality of fourth reinforced structures 152 are provided at intervals along the length direction in the rear-end portion of the lower plate 15. The plurality of third reinforced structures 142 and the plurality of fourth reinforced structures 152 can be disposed to overlap each other. The length by which the rear-end portion of the upper plate 14 extends toward the rear-end side is larger than a length by which the rear-end portion of the lower plate 15 extends toward the rear-end side so as to make the rear-end edge of the upper plate 14 and the rear-end edge of the lower plate 15 not match each other. The first arc-shaped flange 131 is provided at the rear-end edge of the upper plate 14 to prevent the damage to the surrounding wire harness, and in order to prevent the damage to the surrounding wire harness by the rear-end edge of the lower plate 15, it is necessary to make the length by which the rear-end portion of the lower plate 15 extends toward the rear-end side to be less than the length by which the rear-end portion of the upper plate 14 extends toward the rear-end side. According to such a configuration, it is possible to ensure that the rear-end edge of the lower plate 15 does not damage the surrounding wire harness. Since the upper plate 14 and the lower plate 15 have the difference in the length, in order to secure the rigidity of the blocking portion 13, the plurality of third reinforced structures 142 and the plurality of fourth reinforced structures 152 are provided in the upper plate 14 and the lower plate 15 so as to improve the structural strength of the blocking portion 13 and further improve the rigidity of the blocking portion 13.

Furthermore, in FIG. 3 and FIG. 4, in the present embodiment, the angle α between the inclination surface 111 and the horizontal direction is equal to or less than 35 degrees. In other words, it is preferable that the angle α between the inclination surface 111 and the horizontal direction does not exceed 35 degrees. Since the inclination surface 111 is configured to receive the collision force and then break down the collision force, the configuration that the angle α between the inclination surface 111 and the horizontal direction is equal to or less than 35 degrees can cause the component f of the collision force toward the rear-end side to be relatively small and limit the amplitude of the deflection of the battery protection member 1 toward the rear-end side not to be too large. As a result, the possibility of colliding with the front-end portion of the battery pack 3 is reduced so as to further protect the safety of the front-end portion of the battery pack 3 and respond to the obstacle collision problem at the higher driving speed.

According to the present embodiment, the battery protection member 1 including the upper plate 14 and the lower plate 15 is provided. The upper plate 14 and the lower plate 15 are fixed and connected to each other and the buffer cavity 110 is formed by being surrounded by the upper plate 14 and the lower plate 15. The intermediate portion and the front-end portion of the upper plate 14 are attached to the intermediate portion and the front-end portion of the lower plate 15 to form the main body portion 11. The front-end portion of the lower plate 15 is inclined and extends upwardly and toward the front-end side to form the inclination surface 111. The lower portion of the inclination surface 111 is the structural surface of the buffer cavity 110. The front-end portion of the upper plate 14 is inclined and extends upwardly and toward the front-end side to from the front-end surface, and the front-end surface of the upper plate 14 is welded on the surface in the upper portion of the inclination surface 111 near the upper plate 14. The upper edge of the inclination surface 111 extends downwardly and toward the front-end side to form the second arc-shaped flange 112, and the upper edge of the front-end surface of the upper plate 14 is lower than the upper edge of the inclination surface 111. The plurality of first reinforced structures 141 are provided at intervals along the length direction on the front-end surface of the upper plate 14, and the plurality of second reinforced structures 151 are provided at intervals along the length direction on the inclination surface 111. The plurality of first reinforced structures 141 and the plurality of second reinforced structures 151 are disposed to overlap each other. The left end portion and the right end portion of the upper plate 14 and the left end portion and the right end portion of the lower plate 15 are combined to form two fixation portions 12 extending toward the vehicle bottom portion 2. The battery protection member 1 is connected to the vehicle bottom portion 2 via the two fixation portions 12, and the battery protection member 1 is disposed to be apart from the front-end portion of the battery pack 3. The predetermined distance is set between the connection portion 120 of the fixation portion 12 and the vehicle bottom portion 2 and the upper cavity wall 1100 of the buffer cavity 110. The rear-end portion of the upper plate 14 and the rear-end portion of the lower plate 15 are combined to form the blocking portion 13. The plurality of third reinforced structures 142 are provided at intervals along the length direction in the rear-end portion of the upper plate 14, and the plurality of fourth reinforced structures 152 are provided at intervals along the length direction in the rear-end portion of the lower plate 15. The plurality of third reinforced structures 142 and the plurality of fourth reinforced structures 152 are disposed to overlap each other. The length by which the rear-end portion of the upper plate 14 extends toward the rear-end side is larger than the length by which the rear-end portion of the lower plate 15 extends toward the rear-end side. The rear-end edge of the upper plate 14 extends downwardly to form the first arc-shaped flange 131.

When the battery protection member 1 is installed in the vehicle bottom portion 2, the main body portion is disposed to be horizontal, and the battery protection member 1 is disposed to be apart from the battery pack 3 exposed in the vehicle bottom portion 2. The front-end portion of the battery pack 3 is at least partially disposed in the rotation radius range of the battery protection member 1 having the fixation portion 12 as the center. The two fixation portions 12 are provided at the left side and the right side of the main body portion 11, and the two fixation portions 12 are connected and fixed to the left beam and the right beam of the vehicle by screws respectively. The inclination surface 111 is in front of the battery pack 3 and covers the battery pack 3, and the lowest point of the inclination surface 111 is lower than the lowest point of the battery pack 3, and the highest point of the inclination surface 111 is higher than the lowest point of the vehicle auxiliary chassis. The angle α of the inclination surface 111 and the horizontal direction is equal to or less than 35 degrees. When the inclination surface 111 receives the collision of the obstacle, the battery protection member 1 deflects toward the rear-end side with the two connection portions 120 of the two fixation portions 12 and the vehicle bottom portion 2 as the pivots such that the angle α of the inclination surface 111 and the horizontal direction decreases and the whole vehicle can be lifted at the location of the inclination surface 111 with the obstacle as the pivot. As a result, it is possible to make the obstacle smoothly pass through the front-end portion of the battery pack 3. When the collision force is relatively large, the amplitude of the deflection deformation occurred in the battery protection member 1 is relatively large until the blocking portion 13 abuts to the front-end portion of the battery pack 3 so as to prevent the battery protection member 1 from further deflecting toward the rear-end side.

The battery protection member 1 according to the present embodiment includes the inclination surface 111 and the buffer cavity 110. The battery protection member 1 itself deflects toward the rear-end direction with the connection portion 120 of the fixation portion 12 and the vehicle bottom portion 2 as the pivot and deforms when the inclination surface 111 receives the collision of the obstacle. Also, the buffer cavity 110 receives the energy generated during the collision with the obstacle to double absorb the collision so as to overcome the technical problem that the front-end portion of the battery pack 3 exposed under the vehicle is easy to be scratched by the obstacle and damaged. As a result, it is possible to effectively reduce the risk where the front-end portion of the battery pack 3 and secure the safety of the front-end portion of the battery pack 3 even in the situation at a higher driving speed. Also, the blocking portion 13 is provided to prevent the damage due to the excessive deflection of the battery protection member 1 and the configuration of flange is configured to protect the surrounding wire harness.

Second Embodiment

Figure 7:
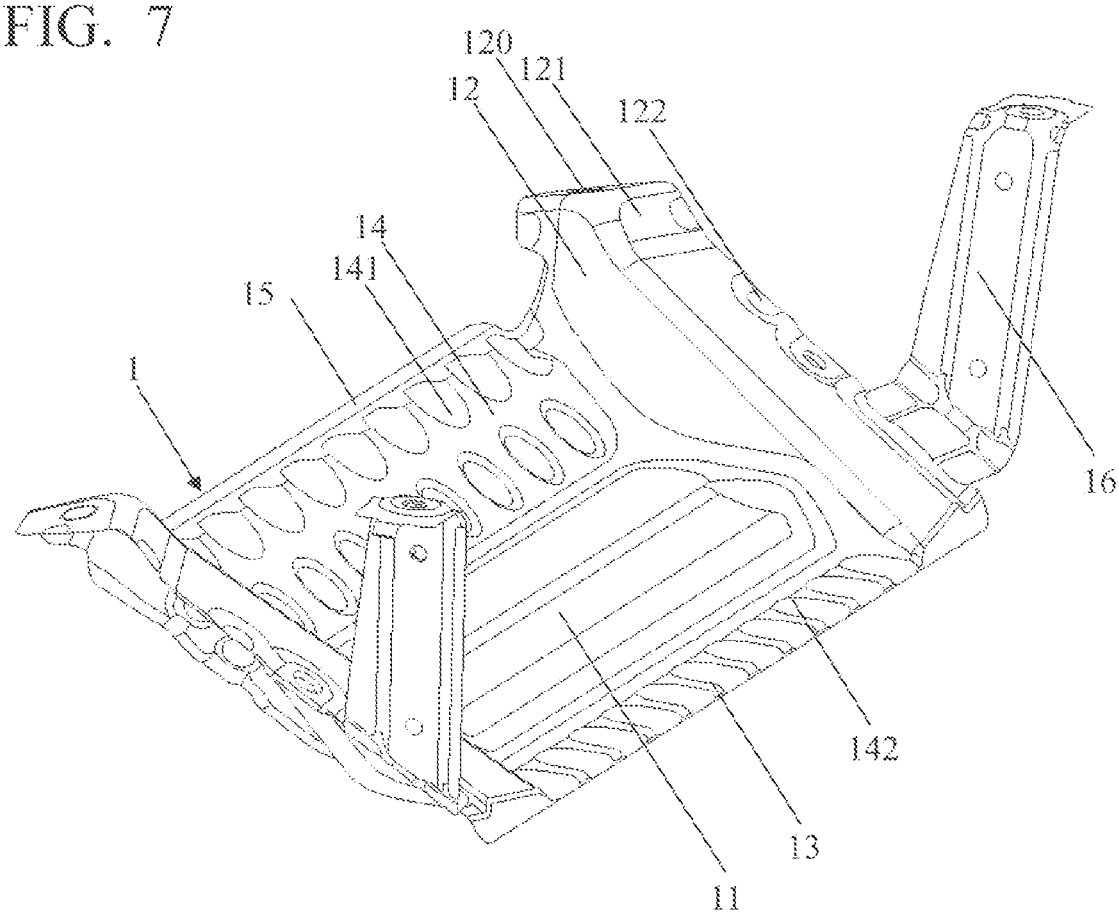
FIG. 7 is a three-dimensional schematic view showing a battery protection member according to a second embodiment of the present disclosure.
Figure 8:
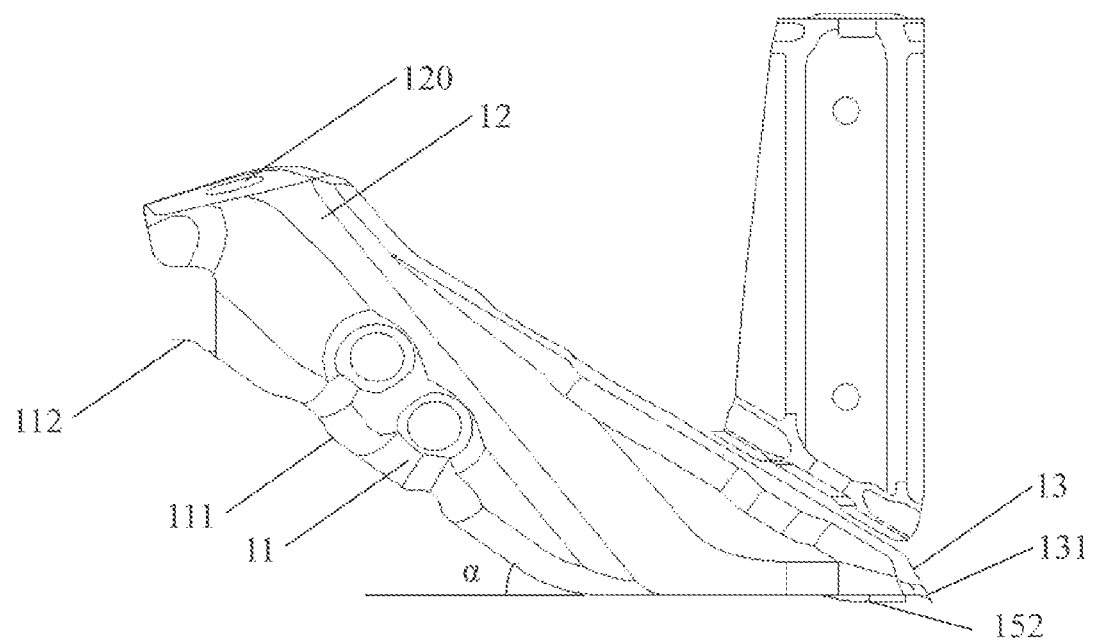
FIG. 8 is a left-side schematic view showing the battery protection member according to the second embodiment of the present disclosure.
Figure 9:
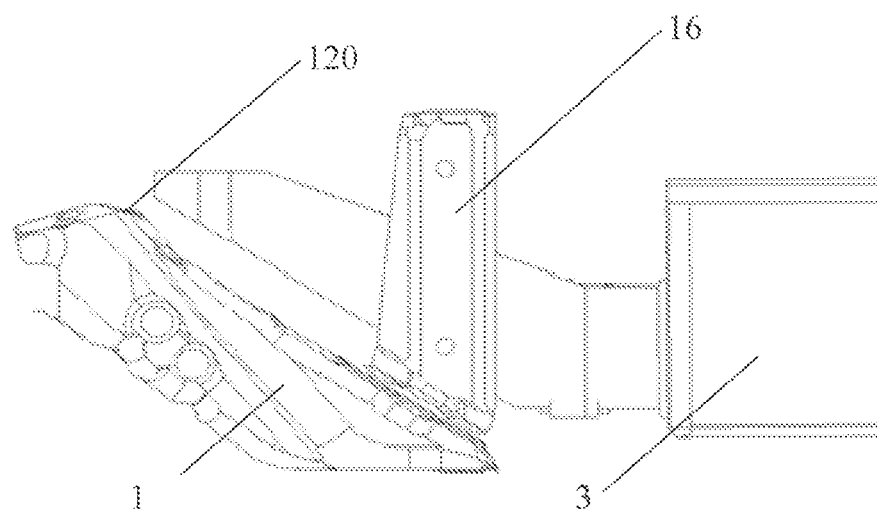
FIG. 9 is a first schematic view showing a working state of the battery protection member according to the second embodiment of the present disclosure.

In FIG. 7 to FIG. 9, a battery protection member 1 is provided in the present embodiment, wherein the battery protection member 1 includes an upper plate 14 and a lower plate 15. The upper plate 14 and the lower plate 15 are fixed and connected to each other and a buffer cavity is formed by being surrounded by the upper plate 14 and the lower plate 15. The intermediate portion and the front-end portion of the upper plate 14 are attached to the intermediate portion and the front-end portion of the lower plate 15 to form a main body portion 11. The front-end portion of the lower plate 15 is inclined and extends upwardly and toward the front-end side to form the inclination surface 111. A lower portion of the inclination surface 111 is a structural surface of the buffer cavity. The front-end portion of the upper plate 14 is inclined and extends upwardly and toward the front-end side to from a front-end surface, and the front-end surface of the upper plate 14 is welded on the surface in the upper portion of the inclination surface 111 near the upper plate 14. The upper edge of the inclination surface 111 extends downwardly and toward the front-end side to form a second arc-shaped flange 112. A plurality of first reinforced structures 141 are provided at intervals along the length direction on the front-end surface of the upper plate 14, and the plurality of second reinforced structures 151 are provided at intervals along the length direction on the inclination surface 111. The plurality of first reinforced structures 141 and the plurality of second reinforced structures 151 are disposed to overlap each other. The upper edge of the front-end surface of the upper plate 14 is lower than the upper edge of the inclination surface 111.

The left end portion and the right end portion of the upper plate 14 and the left end portion and the right end portion of the lower plate 15 are combined to form two fixation portions 12 extending toward the vehicle bottom portion 2. The battery protection member 1 is connected to the vehicle bottom portion 2 via the two fixation portions 12, and the battery protection member 1 is disposed to be apart from the front-end portion of the battery pack 3. In order to correspond to the shape of the front-end portion of the battery pack 3, the connection portion 120 of the fixation portion 12 and the vehicle bottom portion 2 is near the location directly above the upper edge of the inclination surface 111. The upper edge of the fixation portion 12 at the left side of the main body portion 11 extends toward the left side to form a third arc-shaped flange 121, and the upper edge of the fixation portion 12 at the right side of the main body portion 11 extends toward the right side to form the third arc-shaped flange 121. In order to secure the stability of the rear-end portion of the battery protection member 1, two fixation plates 16 are provided in the left-end portion and the right-end portion of the upper plate 14, wherein the two fixation plates 16 extend toward the vehicle bottom portion 2. The two fixation plates 16 are connected to the rear-end portion of the two third arc-shaped flanges 121 respectively for the connection with the vehicle bottom portion 2. Due to the different configuration of the vehicle bottom portion 2, the connection point of the fixation plate 16 and the vehicle bottom portion 2 is higher than the fixation portion 12, and a predetermined distance is set between the connection portion 120 of the fixation portion 12 and the vehicle bottom portion 2 and the upper cavity wall of the buffer cavity. A plurality of five reinforced structures 122 are provided on the third arc-shaped flange 121, and the plurality of five reinforced structures are disposed to be close to the fixation plate 16 and arrange toward the front-end side. A blocking portion 13 is provided in the rear-end portion of the upper plate 14, and a plurality of third reinforced structures 142 are arranged along the length direction in the rear-end portion of the upper plate, and the rear-end edge of the upper plate 14 extends downwardly to form the first arc-shaped flange 131.

When the battery protection member 1 is installed in the vehicle bottom portion 2, the main body portion is disposed to be horizontal, and the battery protection member 1 is disposed to be apart from the battery pack 3 exposed in the vehicle bottom portion 2. The front-end portion of the battery pack 3 is at least partially disposed in the rotation radius range of the battery protection member 1 having the fixation portion 12 as the center. The two fixation portions 12 are provided at the left side and the right side of the main body portion 11, and the two fixation portions 12 are connected and fixed to the left beam and the right beam of the vehicle by screws respectively. The inclination surface 111 is in front of the battery pack 3 and covers the battery pack 3, and the lowest point of the inclination surface 111 is lower than the lowest point of the battery pack 3, and the highest point of the inclination surface 111 is higher than the lowest point of the vehicle auxiliary chassis. The angle α of the inclination surface 111 and the horizontal direction is equal to or less than 35 degrees. When the inclination surface 111 receives the collision of the obstacle, the battery protection member 1 deflects toward the rear-end side with the two connection portions 120 of the two fixation portions 12 and the vehicle bottom portion 2 as the pivots such that the angle α of the inclination surface 111 and the horizontal direction decreases and the whole vehicle can be lifted at the location of the inclination surface 111 with the obstacle as the pivot. As a result, it is possible to make the obstacle smoothly pass through the front-end portion of the battery pack 3. When the collision force is relatively large, the amplitude of the deflection deformation occurred in the battery protection member 1 is relatively large until the blocking portion 13 abuts to the front-end portion of the battery pack 3 so as to prevent the battery protection member 1 from further deflecting toward the rear-end side.

The battery protection member 1 according to the present embodiment includes the inclination surface 111 and the buffer cavity. The battery protection member 1 itself deflects toward the rear-end direction with the connection portion 120 of the fixation portion 12 and the vehicle bottom portion 2 as the pivot and deforms when the inclination surface 111 receives the collision of the obstacle. Also, the buffer cavity receives the energy generated during the collision with the obstacle to double absorb the collision so as to overcome the technical problem that the front-end portion of the battery pack 3 exposed under the vehicle is easy to be scratched by the obstacle and damaged. As a result, it is possible to effectively reduce the risk where the front-end portion of the battery pack 3 and secure the safety of the front-end portion of the battery pack 3 even in the situation at a higher driving speed. Also, the blocking portion 13 is provided to prevent the damage due to the excessive deflection of the battery protection member 1 and the configuration of flange is configured to protect the surrounding wire harness.

Third Embodiment

The battery protection member according to the present embodiment is substantially the same with that according to the second embodiment. The difference between the battery protection member according to the present embodiment with that according to the second embodiment is that: the two fixation plates 16 are provided in the left-end portion and the right-end portion of the lower plate 15, and the fixation plate 16 can be formed to extend upwardly from the upper edge of the fixation portion 12, or the fixation plate 16 can be connected to the rear-end portion of the third arc-shaped flange 121 and extend upwardly after passing through the upper plate 14. It is possible to make the battery protection member 1 correspond to different manufacturing methods.

Fourth Embodiment

In FIG. 4 to FIG. 6, a vehicle is provided in the present embodiment, wherein the vehicle includes a vehicle bottom portion 2, the battery pack 3 is installed in the vehicle bottom portion 2 and the battery protection member 1 is provided in front of the battery pack 3. Here, the battery protection member is any one of the battery protection member according to the first embodiment to the third embodiment. The configuration of the batter protection member 1 is omitted.

According to the vehicle including the battery protection member 1 arranged in front of the battery pack 3, the inclination surface 111 of the battery protection member 1 receives the collision of the obstacle and absorb the energy generated during the collision by the obstacle by the deflection deformation of the battery protection member 1 so as to prevent the obstacle from colliding with the front-end portion of the battery pack 3. Accordingly, it is possible to solve the problem that the front-end portion of the battery pack exposed under the vehicle is easy to be scratched by the obstacle and damaged.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. The present disclosure is not limited by the above description, and is only limited by the appended claims.

REFERENCE SIGNS LIST

1 Battery protection member
2 Vehicle bottom portion
3 Battery pack
11 Main body portion
12 Fixation portion
13 Blocking portion
14 Upper plate
15 Lower plate
16 Fixation plate
110 Buffer cavity
111 Inclination surface
112 Second arc-shaped flange
120 Connection portion of the fixation portion and the vehicle bottom portion
121 Third arc-shaped flange
122 Fifth reinforced structure
131 First arc-shaped flange
141 First reinforced structure
142 Third reinforced structure
151 Second reinforced structure
152 Fourth reinforced structure
1100 Upper cavity wall
α Angle of the inclination surface and the horizontal direction
f Component of the collision force in the rear direction

What is claimed is:

1. A battery protection member configured to protect a battery pack installed in a vehicle, comprising:
    a main body portion; and
    a fixation portion configured to connect the battery protection member to a vehicle bottom portion of the vehicle,
    wherein the battery protection member is disposed at a front-end side of the battery pack and to be apart from the battery pack,
    at least a part of a front-end portion of the battery pack is in a range with the fixation portion as a center and having a rotation radius of the battery protection member,
    an inclination surface is formed at the front-end side of the main body portion to extend from an upper side toward a rear side and a lower side, and
    when the inclination surface receives a collision, an angle between the inclination surface and a horizontal direction is decreased.

2. The battery protection member according to claim 1, wherein when the inclination surface receives the collision, the battery protection member deflects toward a rear side with a connection portion of the fixation portion and the bottom portion of the vehicle as a pivot so as to decrease the angle between the inclination surface and the horizontal direction.

3. The battery protection member according to claim 1, wherein the lowest point of the inclination surface is lower than the lowest point of the front-end portion of the battery pack.

4. The battery protection member according to claim 1, wherein when the battery protection member is installed in the vehicle bottom portion, the highest point of the inclination surface is higher than the lowest point of a vehicle auxiliary bracket.

5. The battery protection member according to claim 1, a buffer cavity is formed inside the main body portion, and a local part of the inclination surface is a structural surface of the buffer cavity.

6. The battery protection member according to claim 5, a predetermined distance is set between an upper cavity wall of the buffer cavity and the connection portion of the fixation portion and the vehicle bottom portion of the vehicle.

7. The battery protection member according to claim 1, wherein the battery protection member further comprises a blocking portion extending from a rear-end edge of the main body portion toward the rear side, and the blocking portion is configured to abut on the front-end portion of the battery pack.

8. The battery protection member according to claim 1, wherein a first arc-shaped flange is formed to downwardly extend from a rear-end edge of the main body portion, and/or a second arc-shaped flange is formed to extend from an upper edge of the inclination surface toward the front-end side.

9. The battery protection member according to claim 1,
    wherein the battery protection member further comprises an upper plate and a lower plate,
    the upper plate and the lower plate are fixedly connected with each other to form a buffer cavity being surrounded by the upper plate and the lower plate,
    the inclination surface is formed by a front-end surface of the lower plate,
    a front-end surface of the upper plate is attached to an upper portion of the inclination surface,
    a lower portion of the inclination surface is a structural surface of the buffer cavity, and
    the fixation portion is formed on the upper plate and/or the lower plate.

10. The battery protection member according to claim 9,
    wherein the front-end surface of the upper plate and the front-end surface of the lower plate are attached and fixed with each other,
    a height of the upper edge of the front-end surface of the upper plate is lower than a height of the upper edge of the front-end surface of the lower plate,
    a plurality of first reinforced structures are disposed at intervals on the front-end surface of the upper plate, and
    a plurality of second reinforced structures are disposed at intervals on the front-end surface of the lower plate.

11. The battery protection member according to claim 1, wherein the angle between the inclination surface and the horizontal direction is equal to or less than 35 degrees.

12. A vehicle comprising the vehicle body portion, wherein the battery pack is installed in the vehicle bottom portion, and the battery protection member according to claim 1 is provided in front of the battery pack.

* * * * *